(12) United States Patent
Brower et al.

(10) Patent No.: US 8,731,354 B2
(45) Date of Patent: May 20, 2014

(54) ARRAY CABLE ASSEMBLIES (75) Inventors: Boyd G. Brower, Keller, TX (US);
Diana Rodriguez, Fort Worth, TX (US);
Tadeusz M. Tenderenda, Warszawa (PL)

(73) Assignee: Corning Cable Systems LLC, Hickory, NC (US)

( * ) Notice: Subject to any disclaimer, the term of this patent is extended or adjusted under 35 U.S.C. 154(b) by 373 days.

(21) Appl. No.: 13/190,722

(22) Filed: Jul. 26, 2011

(65) Prior Publication Data

US 2012/0027361 A1 Feb. 2, 2012

Related U.S. Application Data (60) Provisional application No. 61/369,288, filed on Jul. 30, 2010.

(51) Int. Cl.
*G02B 6/44* (2006.01)
*G02B 6/46* (2006.01)

(52) U.S. Cl.
USPC ............................ 385/101; 385/135; 385/137

(58) Field of Classification Search
USPC ........................................................ 385/101
See application file for complete search history.

(56) References Cited

U.S. PATENT DOCUMENTS

| 4,373,777 | A | * | 2/1983 | Borsuk et al. | 385/139 |
|---|---|---|---|---|---|
| 5,121,458 | A | | 6/1992 | Nilsson et al. | 385/100 |
| 5,210,812 | A | | 5/1993 | Nilsson et al. | 385/100 |
| 5,222,183 | A | * | 6/1993 | Daems et al. | 385/135 |
| 5,440,665 | A | | 8/1995 | Ray et al. | 385/135 |
| 5,517,592 | A | | 5/1996 | Grajewski et al. | 385/138 |
| 5,696,864 | A | * | 12/1997 | Smith et al. | 385/135 |
| 5,997,186 | A | * | 12/1999 | Huynh et al. | 385/99 |
| 6,226,435 | B1 | | 5/2001 | Hunsinger | 385/135 |
| 7,127,143 | B2 | | 10/2006 | Elkins, II et al. | 385/100 |
| 7,302,152 | B2 | | 11/2007 | Luther et al. | 385/135 |
| 7,403,685 | B2 | | 7/2008 | Wells | 385/100 |
| 7,590,321 | B2 | | 9/2009 | Lu et al. | 385/104 |
| 7,609,925 | B2 | | 10/2009 | Gronvall et al. | 385/100 |
| 7,729,583 | B2 | | 6/2010 | Elkins, II et al. | 385/102 |
| 8,472,767 | B2 | * | 6/2013 | Easton et al. | 385/101 |
| 8,475,055 | B2 | * | 7/2013 | Ciechomski et al. | 385/78 |

* cited by examiner

*Primary Examiner* — Michelle R Connelly
(74) *Attorney, Agent, or Firm* — C. Keith Montgomery (57) ABSTRACT An array cable includes radius guides at a tap point of the cable to take up slack for loose fibers at the tap point. The tap point is enclosed in a flexible enclosure that allows the assembly to be pulled through constricted space such as air handling spaces.

17 Claims, 9 Drawing Sheets

ARRAY CABLE ASSEMBLIES

PRIORITY APPLICATION

This application claims the benefit of priority under 35 U.S.C. §119 of U.S. Provisional Application No. 61/369,288, filed on Jul. 30, 2010, the content of which is relied upon and incorporated herein by reference in its entirety.

BACKGROUND

Array cable for use in systems such as distributed antenna systems (DAS) provide connectivity to remote devices along the array cable path. Such cables are typically pulled through air handling spaces such as drop ceilings and raised floors. Each array has tap points where fibers and copper wires are accessed. The cable's connecting fibers are of varying length and require a means for collecting slack at the tap point. Such connections have been made in rigid housings in the past, and the means for collecting slack have been static with respect to the cable. The rigid housings of conventional tap points also make the cable difficult to pull through constricted spaces such as drop ceilings, and the static slack collecting means lack flexibility.

SUMMARY

According to a first aspect, a cable assembly comprises an array cable having a plurality of electrical conductors and a plurality of optical conductors, the array cable having a tap point, at least one radius guide at the tap point, a plurality of optical connections at the tap point, a plurality of electrical connections at the tap point, and an enclosure surrounding the tap point. The radius guide can be translatable along the cable to accommodate varying lengths of optical and electrical conductor slack.

The accompanying drawings are included to provide a further understanding, and are incorporated in and constitute a part of this specification.

DETAILED DESCRIPTION

Figure 1:
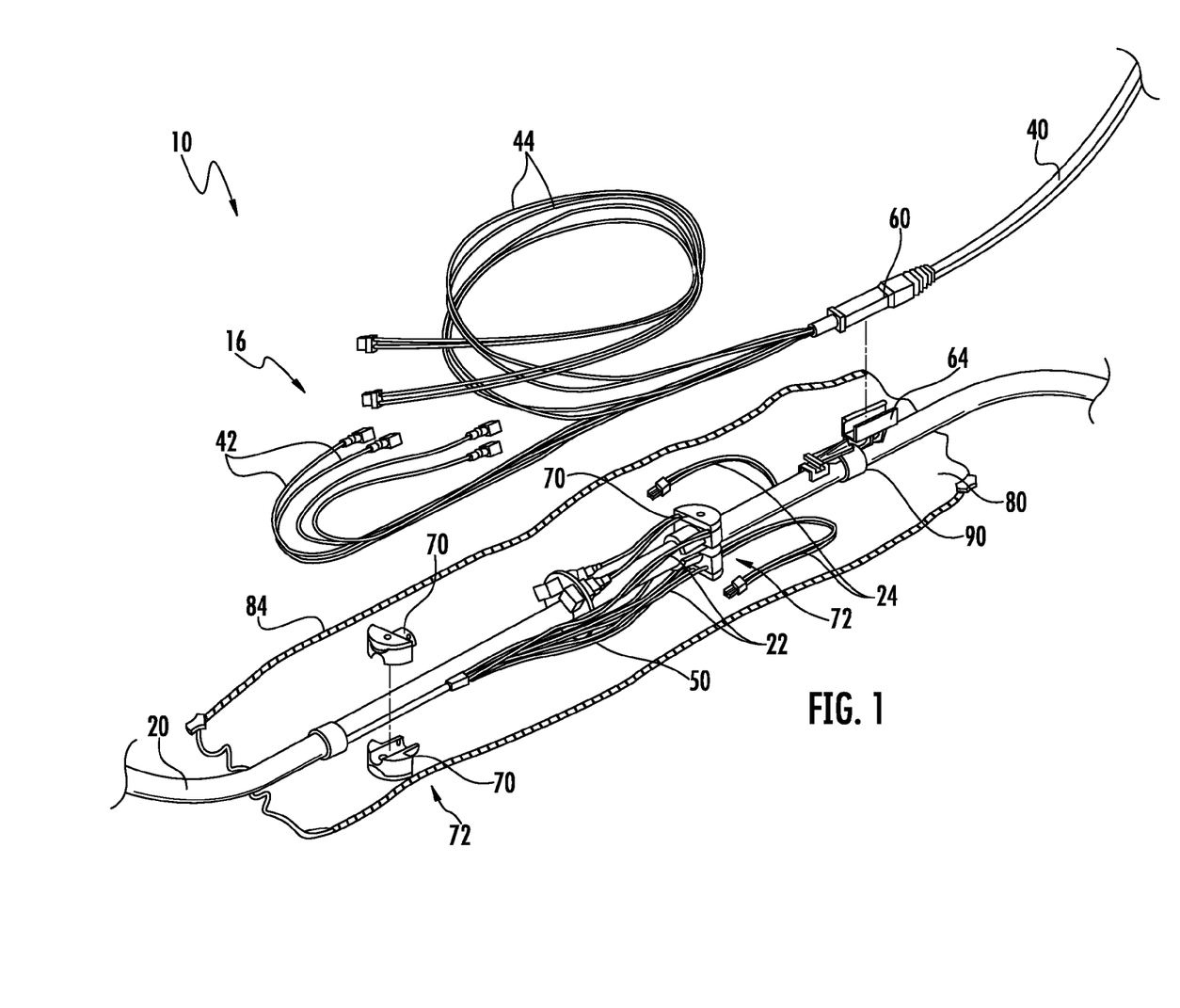
FIG. 1 is a disassembled portion of an array cable assembly at a tap point according to a first embodiment.
Figure 2:
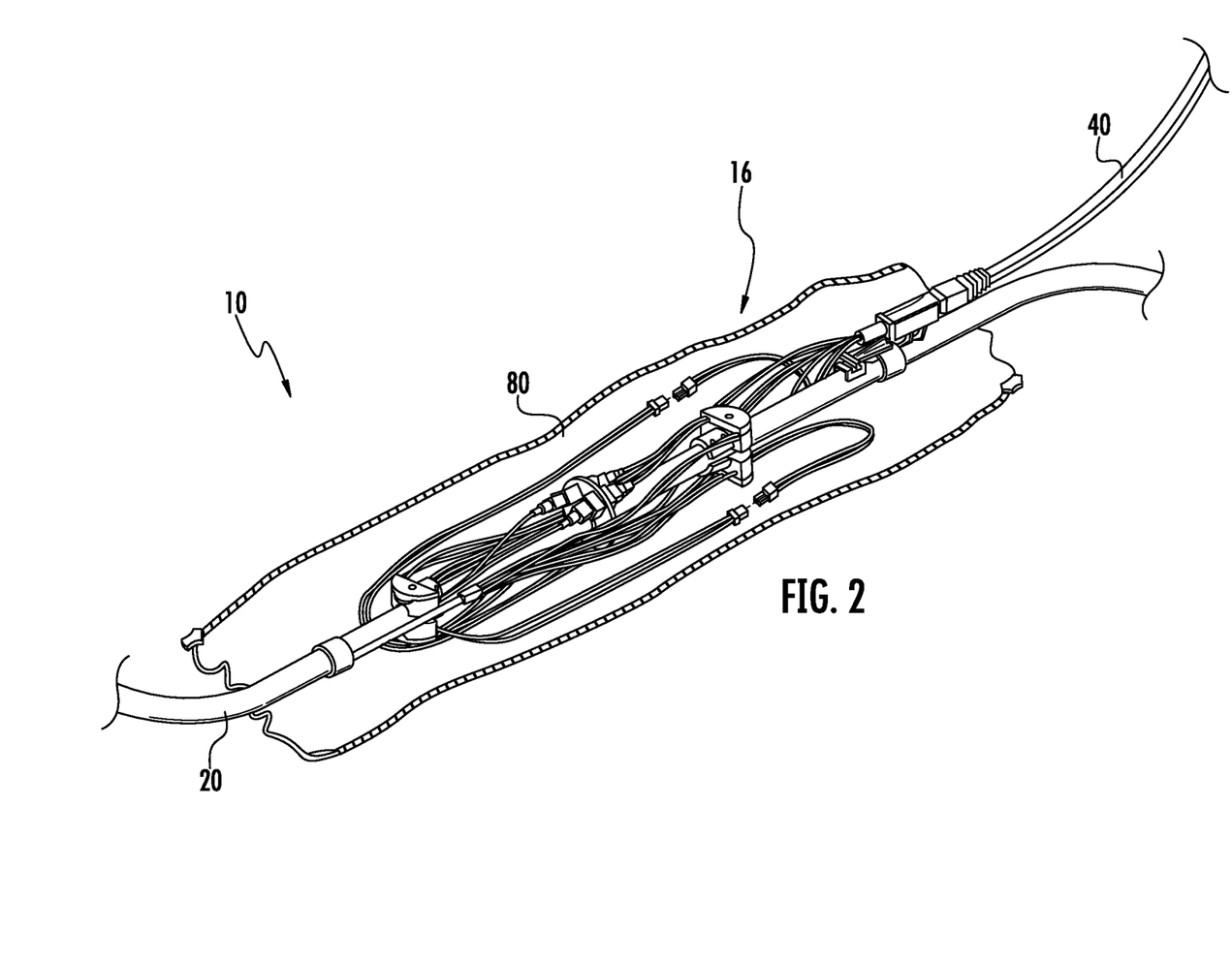
FIG. 2 shows the assembled array cable assembly.

FIG. 1 shows a disassembled portion of an array cable assembly 10. FIG. 2 shows the assembled array cable assembly 10. The illustrated portion is at breakout or tap point 16 of an array cable 20. The array cable assembly 10 is useful in applications such as, for example, distributed antenna systems. The array cable 20 can be, for example, a hybrid cable containing both fiber optic conductors 22 and electrical conductors 24. The array cable assembly 10 can be pulled into air handling spaces such as drop ceilings and raised floors to provide optical and electrical connectivity to devices in a building. In a typical installation in a distributed antenna system, the array cable 20 has multiple tap points 16 where the optical fibers and copper electrical conductors 24 are accessed. The assembly 10 can be formed in the array cable 20 at a manufacturing facility. At the installation site, the assembly 10 is routed through a building, for example, so that remote units such as antenna units (not shown) can be connected at desired locations in the building. The array cable assembly 10 has features that allow it to be easily opened to make fiber and electrical connections at the tap points 16 to power and provide data connectivity to remote units. The array cable assembly 10 also includes features that allow the connections at the tap point 16 to be easily enclosed to protect the connections.

In this specification, the term tap "point" is used to identify a mid-span access location where fibers and electrical conductors are broken out of an array cable. The term "point" is not intended to indicate a specific point on the array cable. Instead, it is a common term used to indicate a general location along the length of the cable where, for example, a protective covering of the array cable is opened to obtain access to fibers and/or electrical conductors in the cable.

At each tap point 16, the optical conductors 22 of the array cable 20 are connected to optical conductors 42 of a tether cable 40, and the electrical conductors 24 of the array cable are connected to electrical conductors 44 of the tether cable 40. The optical conductors 22 can be terminated at connectors (e.g., SC connectors, single, duplex connectors) that connect with adapters at the ends of optical conductors 42. The electrical conductors 24 can be terminated at electrical connectors that connect with the electrical conductors 44. The optical connections are made at an adapter clip 50 that is connected to the array cable 20. The tether cable 40 includes a furcation 60 that mounts in a furcation clip 64, that is in turn mounted to the array cable 20. Radius guides 70 are attached, in opposed pairs 72, on the array cable 20. When assembled, the tap point 16 is enclosed in a durable, flexible enclosure 80, which can be, for example, a pouch.

The tether cable can be, for example, a hybrid optical/electrical cable with a cable jacket and containing one or more optical and/or electrical conductors. The tether cable can be used to provide optical and/or electrical connectivity to an electronic device, or can be a part of an assembly including such a device.

Figure 3:
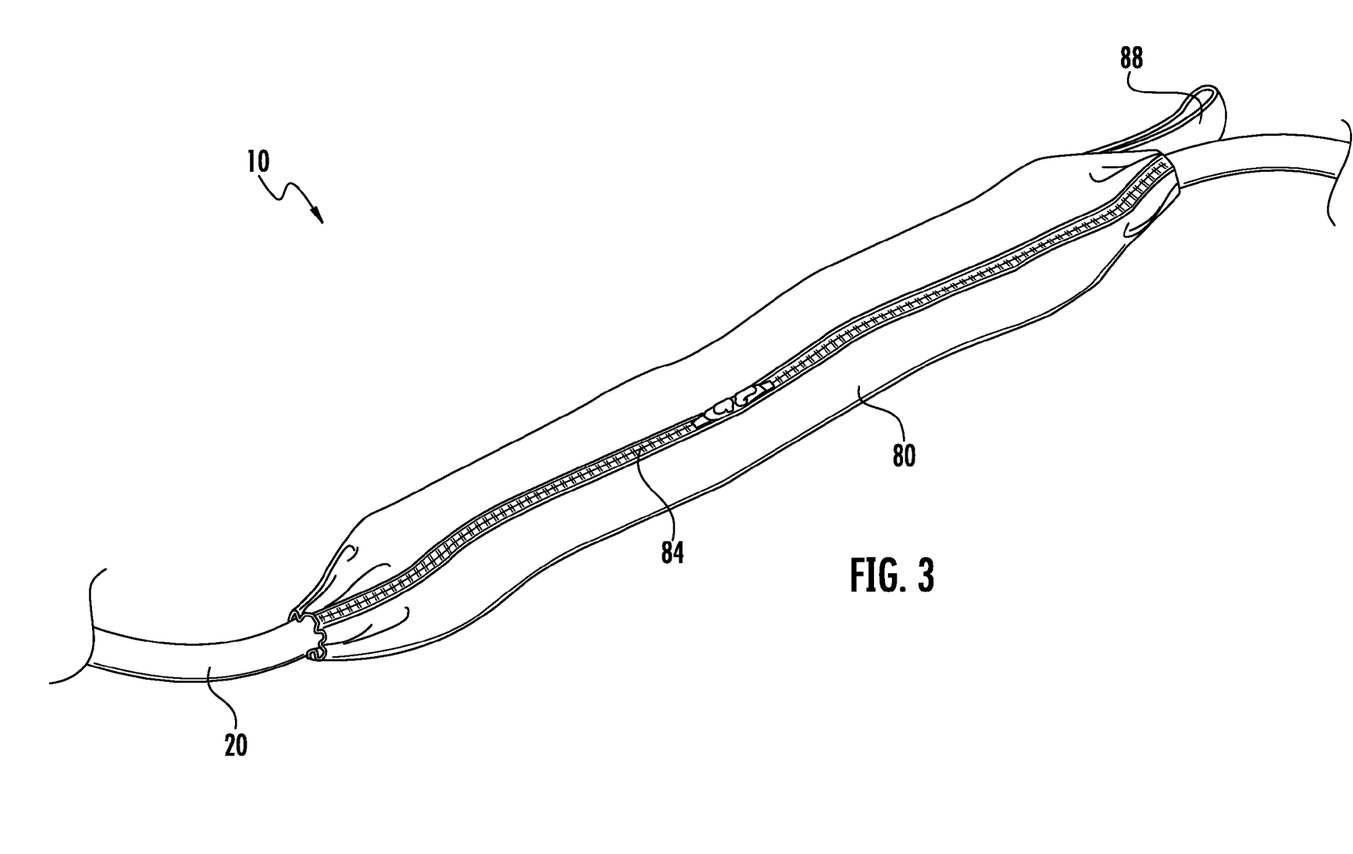
FIG. 3 illustrates the tap point of the array cable assembly of FIGS. 1 and 2 assembled and enclosed in a flexible enclosure.

FIG. 2 shows the partially assembled array cable assembly 10 prior to enclosing the tap point 16 in the flexible enclosure 80. FIG. 3 illustrates the tap point 16 of the array cable assembly 10 fully assembled and enclosed in the flexible enclosure 80. Referring to FIG. 3, the flexible enclosure 80 includes a closure mechanism 84 that allows it to be closed, opened and reclosed about the tap point 12 where the array cable 20 and the tether cable 40 are optically and electrically connected. A preferred closure mechanism 84 is a zipper which can be single or double ended. A double ended zipper has the advantage of allowing the tether to exit the enclosure 80 anywhere along the length of the enclosure 80; the double zipper zips closed from the ends to the center so that it can be unzipped from the center to either end. This facilitates connecting the array cable 20 directly to an external device such as a remote antenna unit (RAU). There can be several tap points 12 along the length of the array cable 20, depending upon the number of optical conductors 22 and electrical conductors 24 in the cable 20, and each tap point 12 along the array cable assembly 10 can be enclosed in an enclosure 80.

The enclosure 80 can be constructed of a flexible, plenum-rated material that deforms during installation. Materials that can be used to construct the enclosure 80 include, for example, glass cloth, NOMEX®, KEVLAR®, metal mesh, and other flame resistant and/or plenum rated materials. The enclosures 80 can be installed on the assembly 10, for example, at the manufacturing facility in order to protect the connections during both shipment and installation of the array cable 10, as well as during the operational life of the installation. The array cable assembly 10 can be pulled into position during installation with the enclosures 80 so that the enclosures prevent catching. A pulling grip 88 can be included at one or both ends of the enclosures 80 to facilitate installation. Once in position, for each tap point, an enclosure 80 is opened, the tether cable 40 connections are made to the array cable 20, and the enclosure 80 is re-closed. The internal mounting features on the array cable 20 may be factory or field installed. The openings on each end of the enclosure 80 are large enough to allow the cables to exit, but too small to allow the cable furcations to slide through. The furcation ends may be shaped to facilitate pulling past catch points during installation. Loops of material may be provided on the enclosure 80 to allow cable ties or other ties, etc. to keep the enclosure 80 from sliding along the cable 20. Pockets (not shown) may be provided inside the enclosure 80 to hold internal parts in place.

Figure 4:
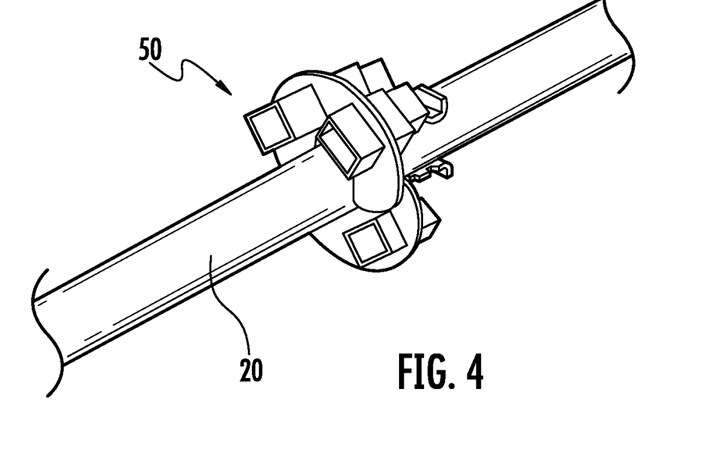
FIG. 4 illustrates an adapter clip secured to the array cable of FIGS. 1 and 2.
Figure 5:
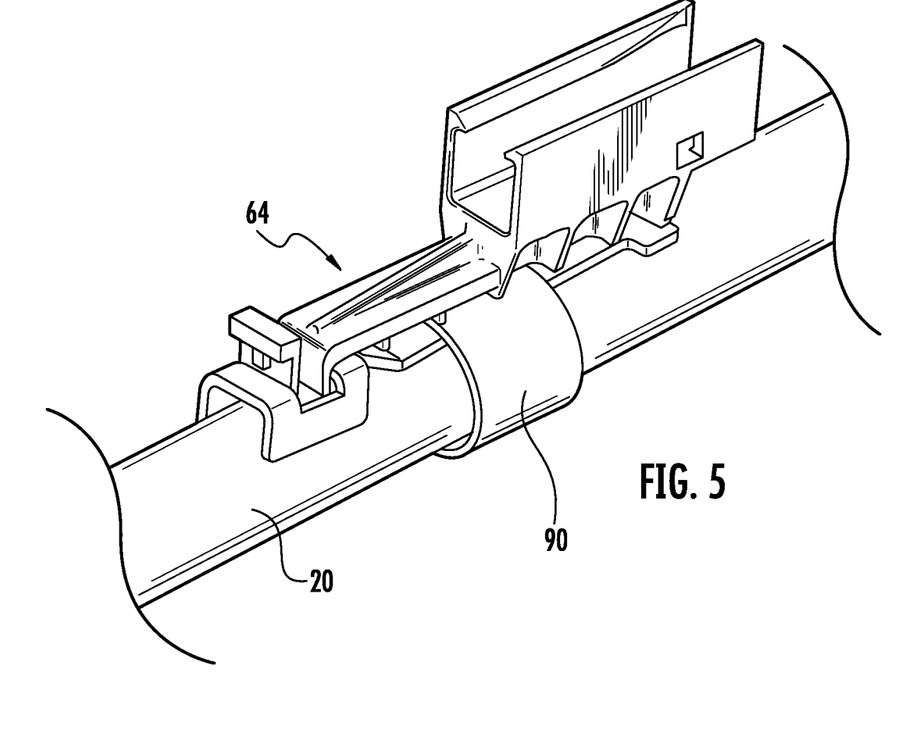
FIG. 5 illustrates a furcation clip secured to the array cable of FIGS. 1 and 2.

FIG. 4 illustrates the adapter, or adapter "clip" 50 secured to the array cable 20 by, for example, a bracket that is strapped or clipped to the cable. The optical connections at the tap point 12 are made at the adapter clip 50. The adapter clip 50 can also provide mounting positions for the electrical connectors and slots for fibers. FIG. 5 illustrates the furcation clip 64 secured to the array cable 20. The furcation clip 64 can be mounted to the array cable 20 by, for example, a metallic band that 90 is heat shrunk onto the cable.

Figure 6:
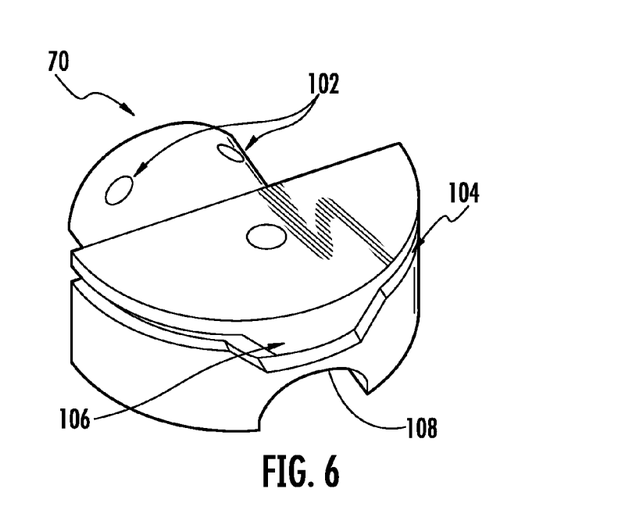
FIG. 6 illustrates a radius guide of the array cable of FIGS. 1 and 2.

FIG. 6 illustrates a radius guide 70. Referring back to FIG. 2, the guides 70 are secured to the cable in opposed pairs as shown in FIGS. 1 and 2. The radius guides 70 can be secured to the array cable 20 by passing an elongate strap, such as a tie wrap, through cable tie holes 102 in opposed guides 70. The guides 70 can, for example, be clipped to the hybrid cable 20 to facilitate axial positioning along the cable before using cable ties or straps, or the guides 70 may alternatively be designed to clip to the cable without using cable ties. The radius guide 70 includes one or more fiber retainer grooves 104 running around its leading edge 106 that accommodates one or more fibers as shown in FIG. 2. The leading edge 106 may be beveled to prevent catching of the assembly 10 as it is pulled through small spaces during installation. The leading edge 106 can also serve as a closure projection to retain fibers within the groove 104. The underside of the radius guide 70 can have an arcuate profile 108 so that the guide sits securely on the cable surface. In applications as disclosed in the present embodiments, connecting fibers of varying length requires a means of looping the fibers to take up slack. Such connections have been made in rigid housings in the past. According to one aspect of the present embodiments, fibers are looped around the movable spaced radius guides 70, and held within the slots 104. In order to accommodate fiber length variations, the fibers are routed past the adapter clip 50 and looped back.

The axial position of the radius guides 70 and the adapter clip 50 may be varied axially along the array cable 20 to accommodate varying fiber lengths. For example, the guides 70 and the clip 50 can be axially repositioned to take up fiber slack by sliding the clip along the cable, such as by detent positioning devices on the clip, or by spring loaded radius guides. The radius guides 70 prevent the fiber loop from being compressed, maintains control of the fiber loops, and maintain the distance between loops to prevent fiber buckling.

Figure 7:
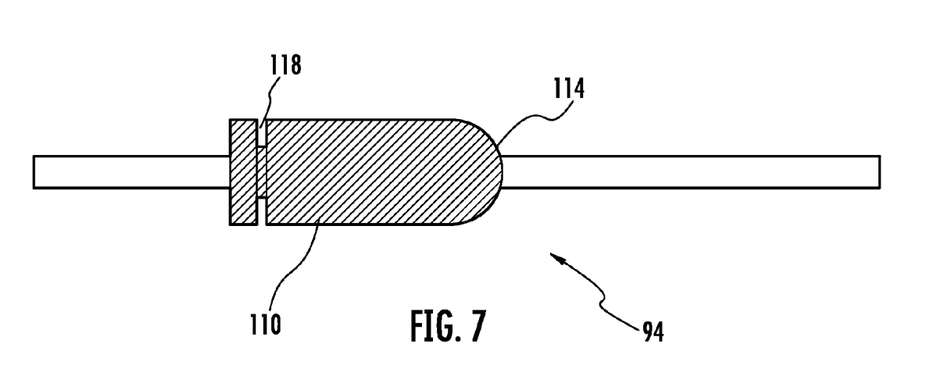
FIG. 7 illustrates a dummy furcation that provides a holding point for the enclosure and facilitates pulling the array cable assembly around obstacles.

FIG. 7 illustrates a dummy furcation 94. The dummy furcation 94 provides a holding point for the enclosure 80 and facilitates pulling the array cable assembly 10 around obstacles. The dummy furcation 94 is attached to the cable 20, and has a body 110 with a rounded leading edge 114 to facilitate feeding past obstacles as the cable 20 is pulled into position. The dummy furcation 94 can be potted onto the cable 20, secured by cable ties, etc. The dummy furcation 94 has one or more grooves 118 to facilitate attachment to attach a two-part furcation to the cable 20, or to tie an inside loop of the enclosure 80 to ensure that the enclosure doesn't move along the cable 20.

The individual tether cables 40 can be connected to components such as remote antenna units (RAU) in a wireless distributed antenna system. The array cable 20 can be connected directly to, for example, a riser cable in an interconnect unit (ICU), or to a tail cable. The tail cable can be used to extend the reach of the array cable assembly 10. The array tap points 16 may also be connected directly to an RAU. A double-ended zipper allows the tap point fibers to exit anywhere along the length of the enclosure 80. In conventional cables, fiber loops in the flexible enclosure 80 can be distorted by compression or twisting as a result of the flexibility that allows the enclosure to be pulled into position. The fiber loops can also be pushed along the length of the enclosure 80 and cause fibers to buckle. Such distortion of the fibers can result in degraded performance. According to one aspect of the present embodiments, the radius guides 70 provide a positive limitation to the loop radius, prevents the fiber loop from being compressed during installation, maintains control of the fiber loops and maintains the distance between loops to prevent fiber buckling.

Figure 8:
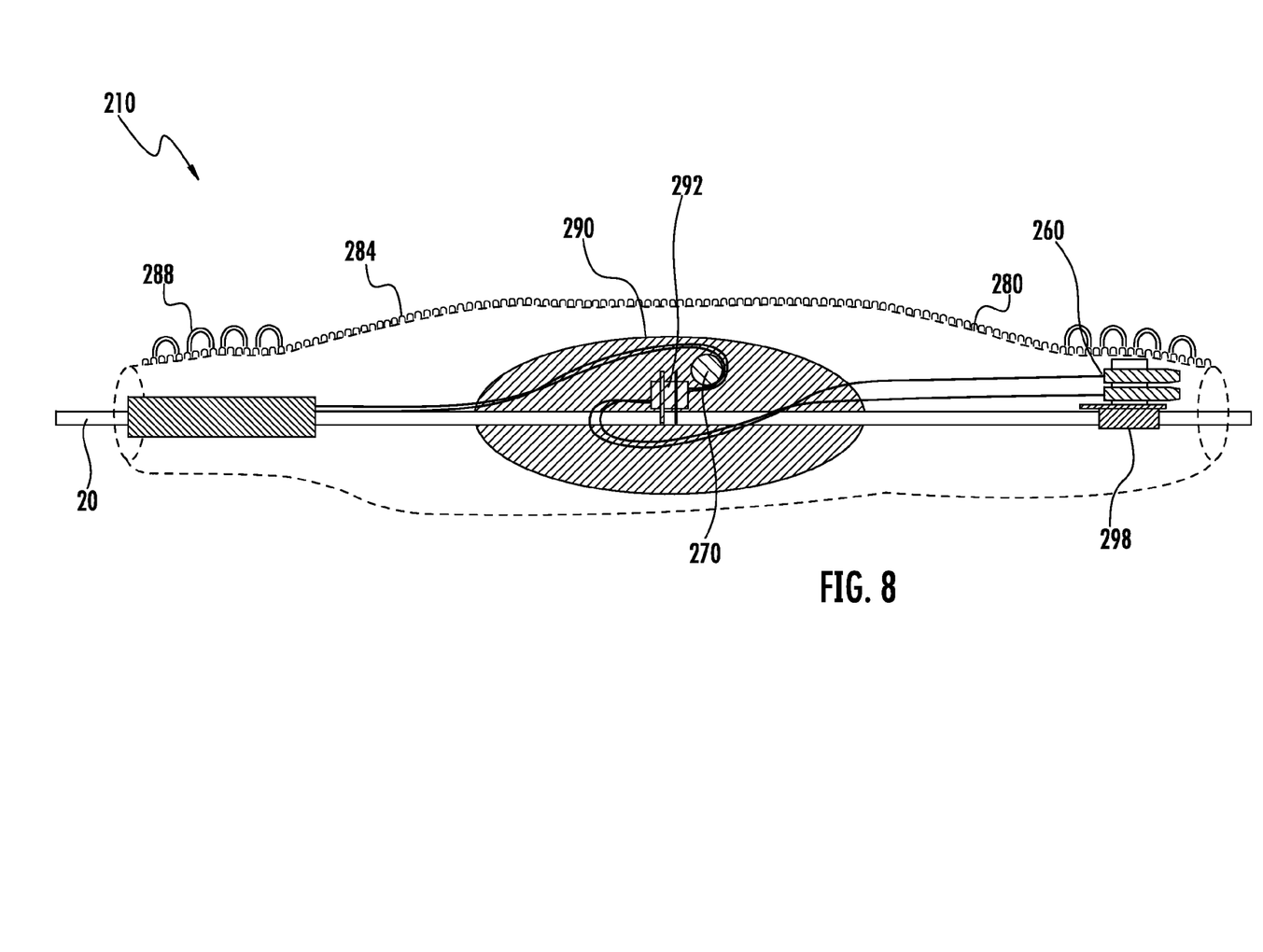
FIG. 8 is a partial cutaway view of an array cable assembly according to another embodiment.
Figure 9:
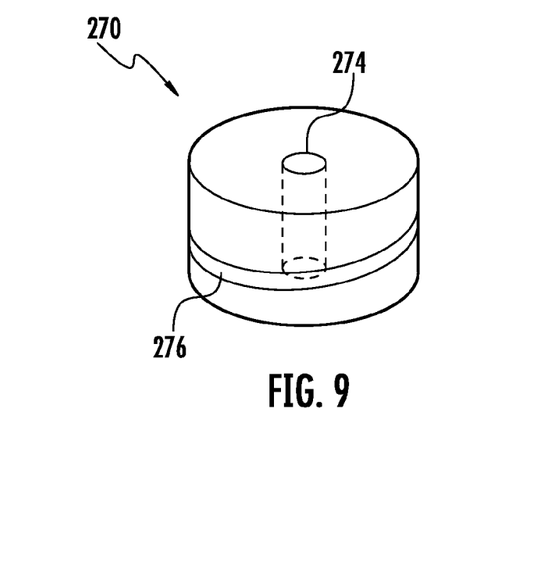
FIG. 9 illustrates a radius guide of the array cable of FIG. 8.

FIG. 8 is a partial cutaway view of an array cable assembly 210 according to another embodiment. The array cable assembly 210 is substantially similar to the assembly 10 shown in FIGS. 1 and 2, except that individual radius guides 270 are provided for each loose fiber in a flexible enclosure 280 having a closure mechanism 284 and pulling loops 288. An individual radius guide 270 is shown in FIG. 9. As shown in FIG. 9, the radius guide 270 include a mounting aperture 274, and a fiber retaining groove 276.

Referring back to FIG. 8, the assembly 210 also includes an adapter holder 290 that has the form of an obround, generally flat plastic plate upon which the radius guides 270 are mounted. The radius guides 270 can be mounted to posts (not shown) on the adapter holder 290 by, for example, inserting a post into the mounting aperture 274. The adapter holder 290 also serves as a mounting device for an adapter 292 at which optical connections are made between an array cable and tether cables, remote units, etc. The curved shape of the adapter holder 290 plate facilitates pulling of the assembly 210 through tight spaces, etc. Furcations 260 of the optical fibers, such as those connecting to a tether cable, are held in furcation clips 298 on the array cable 20.

Figure 10:
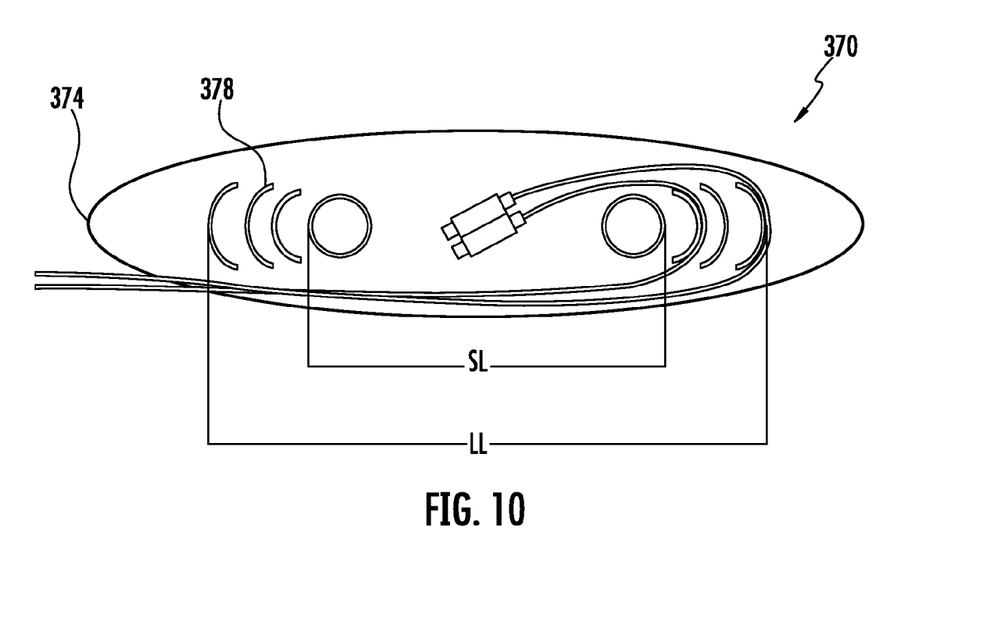
FIG. 10 illustrates an alternative radius guide.

FIG. 10 illustrates an alternative radius guide 370. The radius guide 370 can be a single molded piece including curved fiber guide sections 378. The radius guide 370 can be used as an alternative to the adapter holder 290 and radius guides 270 in FIG. 9.

Figure 11:
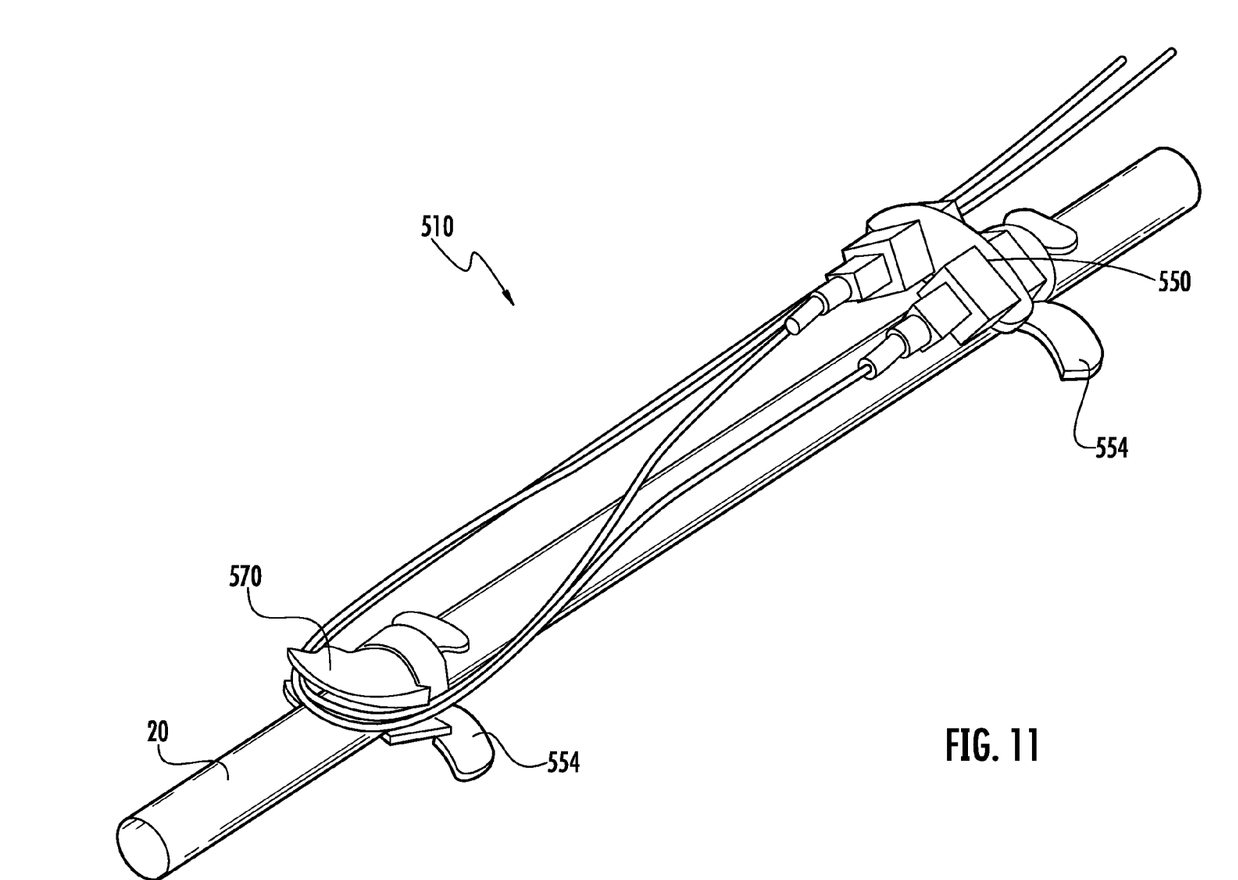
FIG. 11 is a partial view of an array cable assembly according to another embodiment.

FIG. 11 is a partial view of an array cable assembly 510 according to another embodiment. The array cable assembly 510 can be used with an enclosure 80 such as is shown in FIG. 3. The array cable assembly 510 has an adapter clip 550 spaced from one or more radius guides 570 along the array cable 20. The radius guide 570 and the adapter clip 550 can be secured to the array cable 20 by straps 554, such as a tie wrap, VELCRO strap, tape, etc. Both the adapter clip 550 and radius guides 570 can be axially translatable along the array cable 20 to take up slack in fiber loops. If additional connectors are mounted to the adapter clip 550, a second radius guide 570 can be stacked onto the first. Additional radius guides can be mounted on projections extending from the radius guide 570.

Figure 12:
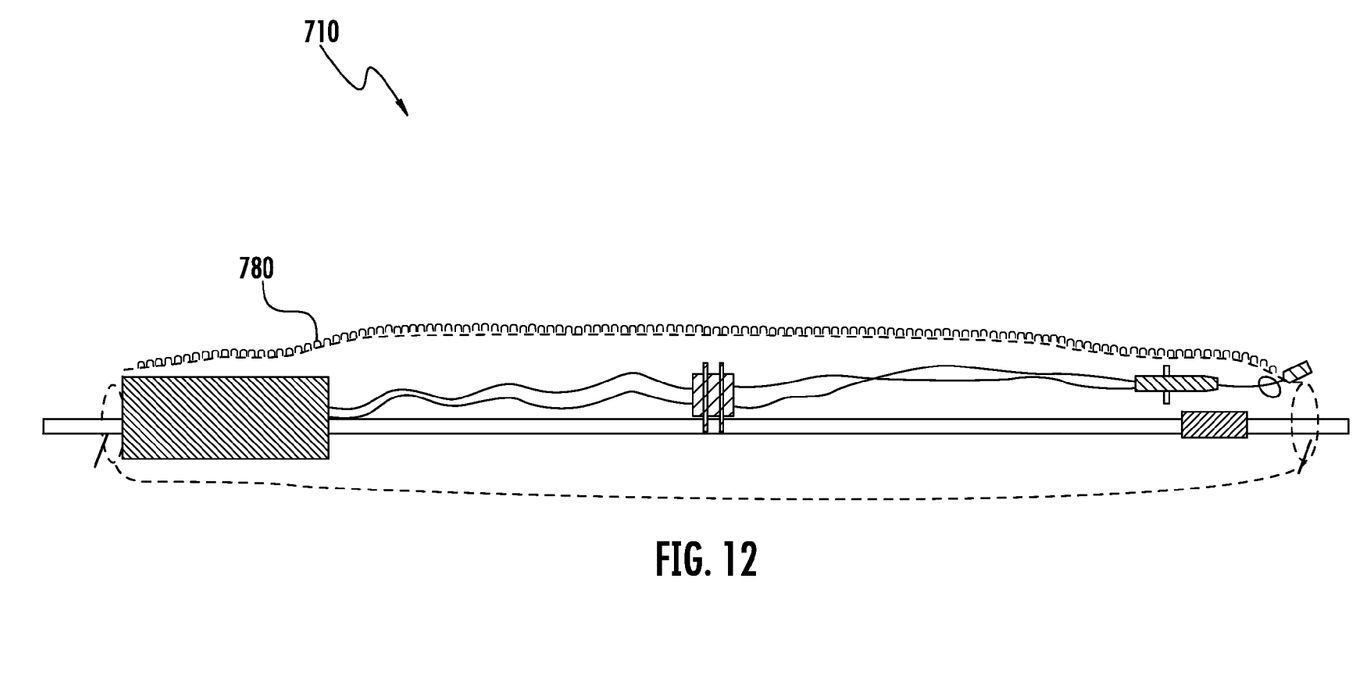
FIG. 12 is a partial view of an array cable assembly according to yet another embodiment.

FIG. 12 is a partial view of an array cable assembly 710 according to another embodiment. The cable assembly 710 can be similar to the array cable assembly 10 shown in FIG. 1, but does not include radius guides. In this assembly, the fiber length is matched to the length of the flexible enclosure 780 so there is some slack but not enough to require the fiber to be looped back on itself. This embodiments utilizes a longer flexible enclosure 780 to allow for a minimum length of fiber in order to allow polishing and because of the possibility of rework.

Many modifications and other embodiments of the present invention, within the scope of the claims will be apparent to those skilled in the art.

What is claimed is:

1. A cable assembly, comprising:
an array cable having a plurality of electrical conductors and a plurality of optical conductors, the array cable having a tap point;
at least one radius guide at the tap point, the at least one radius guide having surface arranged to accommodate at least one optical fiber wrapped at least partially therearound, wherein the at least one radius guide is translatable along the array cable;
at least one optical connection at the tap point;
at least one electrical connection at the tap point;
an enclosure at least partially surrounding the tap point; and
at least one tether extending away from the tap point, the tether having at least one tether optical conductor and at least one tether electrical conductor, the at least one tether optical conductor being connected to one of the optical conductors of the array cable at at least one of the optical connections, and the at least one tether optical fiber being at least partially wrapped around the at least one radius guide,
wherein the at least one tether electrical conductor is connected to one of the electrical connectors of the array cable at at least one of the electrical connections.

2. The cable assembly of claim 1, wherein the at least one optical connection is located at an adapter.

3. The cable assembly of claim 2, wherein the adapter is translatable along the cable.

4. The cable assembly of claim 2, wherein the at least one electrical connection is located at the adapter.

5. The cable assembly of claim 1, further comprising a furcation clip mounted on the array cable at the tap point and spaced from the at least one radius guide, the tether being mounted to the furcation clip.

6. The cable assembly of claim 1, wherein the at least one tether electrical conductor contacts and is at least partially wrapped around the at least one radius guide.

7. The cable assembly of claim 1, wherein the at least one radius guide is mounted to the array cable.

8. The cable assembly of claim 1, wherein the at least one radius guide comprises a first radius guide at a first location on the array cable and a second radius guide at a second location on the array cable.

9. The cable assembly of claim 8, wherein the first radius guide and the second radius guide are located on opposite sides of the cable.

10. The cable assembly of claim 1, wherein the enclosure is a flexible pouch.

11. The cable assembly of claim 1, wherein at least one optical conductor contacts and is at least partially wrapped around the at least one radius guide.

12. The cable assembly of claim 1, further comprising an adapter holder mounted to the array cable, wherein the at least one radius guide is mounted to the adapter holder.

13. The cable assembly of claim 12, wherein the at least one optical connection is located at the adapter holder.

14. The cable assembly of claim 1, wherein at least one radius guide comprises a polymer plate with curved radius guides formed thereon.

15. A method of connecting a remote device to an array cable assembly, the method comprising:
providing an array cable assembly comprising: an array cable having a plurality of electrical conductors and a plurality of optical conductors, the array cable having a tap point; at least one radius guide at the tap point; at least one optical connection at the tap point; and at least one electrical connection at the tap point;
looping at least one remote device optical conductor that is in optical communication with the remote device around the at least one radius guide;
translating the radius guide to take up slack in the at least one remote device optical conductor.

16. The method of claim 15, further comprising optically coupling the remote device to the array cable at the at least one optical connection.

17. The method of claim 16, further comprising:
electrically coupling the remote device to the array cable at the at least one electrical connection; and
enclosing the tap point in a flexible enclosure.

* * * * *